March 1, 1927.
H. BROWN
SAFETY DEVICE FOR AUTOMOBILES
Filed Dec. 6, 1924
1,619,697
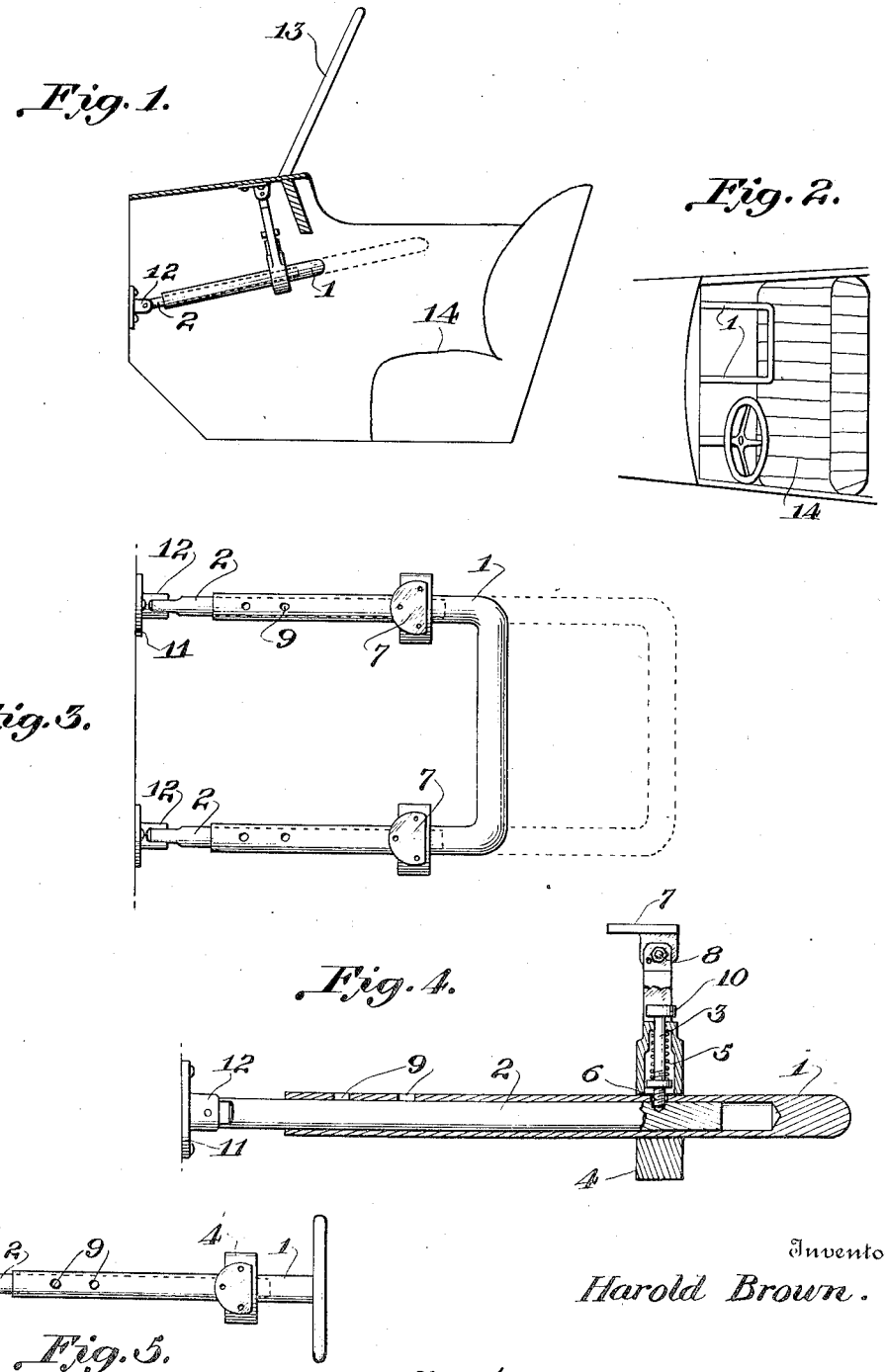

Patented Mar. 1, 1927.

1,619,697

UNITED STATES PATENT OFFICE.

HAROLD BROWN, OF KANSAS CITY, KANSAS.

SAFETY DEVICE FOR AUTOMOBILES.

Application filed December 6, 1924. Serial No. 754,346.

One of the objects of this invention is to prevent the occupant of an automobile from being hurled against the wind shield in case of accident. Another object of the invention is to so design a device that it will be simple, attractive, and inexpensive. A further object is to provide a convenient hand grip or arm rest for use when riding over rough roads or across uneven places. Another object is to provide a convenient and comfortable means that may be used as an arm rest at any time. A further object is to so arrange the adjustments that the device may be pushed entirely out of the way when not in use; for instance, at such times as loading or unloading the car.

The invention consists in the construction and novel combination and arrangement of parts hereafter fully described, illustrated in the accompanying drawings, and pointed out in the claims.

In the drawings, Fig. 1 shows a side elevation of an assembled view, including the combination of this invention with the seat, and wind shield of an automobile.

Fig. 2 illustrates in a diagrammatic form the relation of the steering wheel in an automobile to the hand grip or safety device comprising this invention.

Fig. 3 is a plan view of the safety device disclosed in Fig. 1.

Fig. 4 illustrates a section view of the sliding rod and tubular bar, together with a section view of the journal bracket and locking device.

Fig. 5 is a view of a modified form of safety device.

1 is an arm rest or hand grip bar slidably cooperating with a plunger rod 2, it being immaterial so far as this invention is concerned whether the rod portion 2 or the tubular element 1 is used as the hand grip; that is, the arm rest may be a rod, sliding in tubular guides in which case the journal bracket 4 will be rigidly attached to the tubular guide, while the arm rest rod will slide freely in the tubular guides. The plunger rod 2, after being adjusted to position is rigidly pinned in place by a bolt pin 3 cooperating with a spring member 5 which acts to hold the said bolt pin rigidly in the notch or groove 6 of the rod 2, and the bolt hole 9 of the tubular bar 1, the said pin 3 is headed by a suitable thumb cap 10, adapted to be used when it is desired to release the bolt pin, and to adjust the tubular hand grip 1.

The journal bracket 4, which includes the bolt pin 3 and spring members 5, is fitted at one end with a plate bracket 7, pivoted at 8, and adapted to be rigidly fitted to automobiles having different angles of frame work. The rod 2 is fitted at one end with a bracket plate 11, pivoted at 12, adapted to be adjusted for any angle of the front frame.

The wind shield is designated by the numeral 13, the seat by 14.

In operation the occupant merely reaches over and takes hold of the hand grip 1, releases the bolt pin 3 by means of raising the thumb cap 10, and pulls the hand grip toward him. On reaching a notch in the rod 2 the bolt pin 3 will snap into position by the action of the spring 5, thereby holding the safety device in rigid position in front of the occupant. The sliding element may be arranged for any number of adjustments as shown by Figs. 1 and 2. In Fig. 2 the relation of this invention to the steering wheel of an automobile is clearly shown; as readily understood the steering wheel will operate to prevent the driver from being hurled against the windshield in case of accident, while the safety device specified and claimed in this application will not only function to serve the passenger as a safety feature, but also act as a hand and arm rest at any time.

What I claim is:

1. The combination with the cowl and front body portions of an automobile body having a seat and windshield, of means adapted to prevent the occupant of said automobile from being hurled against the said windshield in case of accident, the said means consisting of a hand grip or arm rest, comprising bracket portions adapted for attachment to the cowl and automobile body portions and a rod slidably adjustable within a tubular bar, the adjustable rod and tubular bar being supported by said bracket portions.

2. The combination with the cowl and front body portions of an automobile body having a seat and wind shield, of means adapted to prevent the occupant of said automobile from being hurled against the said wind shield in case of accident, the said means consisting of a hand grip or arm rest, comprising bracket portions adapted for attachment to the cowl and front body portions, and a rod slidably adjustable within a tubular bar, the said rod and tubular bar being held rigidly in adjusted position by means of a pin and spring positioned in the said bracket portions.

3. A safety device for automobiles, comprising a rod and tubular bar in slidable relation to each other, supporting brackets for attaching the device to the cowl and front body portions of an automobile, and of means positioned in said brackets for rigidly holding the rod and tubular bar in adjusted relation, the said means consisting of a bolt pin adapted to hold the rod and tubular bar in rigid adjustment by means of a spring.

4. The combination with a cowl and front body portion of an automobile having a seat and wind shield, of means adapted to prevent the occupant of said automobile from being hurled against the said wind shield in case of accident, the said means consisting of an arm or hand rest attached to the automobile body adjacent the steering wheel.

In testimony whereof I affix my signature.

HAROLD BROWN.